(12) United States Patent
Ladra et al.

(10) Patent No.: US 8,157,252 B2
(45) Date of Patent: Apr. 17, 2012

(54) MACHINE TOOL

(75) Inventors: Uwe Ladra, Erlangen (DE); Gabriele Schmitt-Braess, Erlangen (DE); Elmar Schäfers, Fürth (DE)

(73) Assignee: Siemens Aktiengesellschaft, München (DE)

( * ) Notice: Subject to any disclaimer, the term of this patent is extended or adjusted under 35 U.S.C. 154(b) by 409 days.

(21) Appl. No.: 12/446,695

(22) PCT Filed: Oct. 17, 2007

(86) PCT No.: PCT/EP2007/061060
§ 371 (c)(1),
(2), (4) Date: Apr. 22, 2009

(87) PCT Pub. No.: WO2008/049764
PCT Pub. Date: May 2, 2008

(65) Prior Publication Data
US 2010/0032879 A1 Feb. 11, 2010

(30) Foreign Application Priority Data
Oct. 23, 2006 (DE) .................. 10 2006 049 867

(51) Int. Cl.
*B23Q 1/64* (2006.01)
*B23Q 11/00* (2006.01)

(52) U.S. Cl. .............. 269/56; 269/86; 409/141

(58) Field of Classification Search .......... 269/56, 269/86; 29/559; 409/131, 141
See application file for complete search history.

(56) References Cited

U.S. PATENT DOCUMENTS

| | | | |
|---|---|---|---|
| 3,230,831 A * | 1/1966 | Harker | 409/141 |
| 4,602,459 A | 7/1986 | Drits et al. | |
| 5,133,527 A * | 7/1992 | Chen et al. | 248/550 |
| 5,558,557 A * | 9/1996 | Dashevsky | 451/10 |
| 5,957,016 A * | 9/1999 | Segalman et al. | 82/1.11 |
| 6,085,121 A | 7/2000 | Stern | |
| 6,230,070 B1 | 5/2001 | Yodoshi | |
| 6,241,435 B1 * | 6/2001 | Huang et al. | 409/141 |
| 6,537,000 B1 | 3/2003 | Weck | |
| 6,888,436 B1 | 5/2005 | Forster et al. | |
| 2010/0164156 A1* | 7/2010 | Bretschneider et al. | 269/86 |

FOREIGN PATENT DOCUMENTS

| | | |
|---|---|---|
| DE | 25 20 946 | 11/1976 |
| DE | 44 05 660 | 8/1995 |
| DE | 198 25 373 | 12/1999 |
| DE | 19859360 A1 | 7/2000 |
| DE | 698 04 982 | 11/2002 |
| DE | 29924562 U1 | 11/2003 |
| DE | 10220937 A1 | 12/2003 |
| DE | 10229134 A1 | 1/2004 |
| EP | 0599020 A1 | 6/1994 |

OTHER PUBLICATIONS

Goodwin, Graebe, Salgado: "Control System Design", Prentice Hall, 2001.; Others; 2001; (2011Q25358).

* cited by examiner

*Primary Examiner* — David B Thomas
(74) *Attorney, Agent, or Firm* — Henry M. Feiereisen; Ursula B. Day

(57) ABSTRACT

The invention relates to a machine tool, wherein the machine tool has a workpiece clamping device (10) for clamping a workpiece (9), wherein the workpiece clamping device (10) and in this way the workpiece (9) can be moved by means of a piezoactuator (11a, 11b, 11c, 11d). The invention furthermore relates to a corresponding method. The invention provides a machine tool in which vibrations occurring during a machining operation are reduced.

11 Claims, 3 Drawing Sheets

MACHINE TOOL

CROSS-REFERENCES TO RELATED APPLICATIONS

This application is the U.S. National Stage of International Application No. PCT/EP2007/061060, filed Oct. 17, 2007, which designated the United States and has been published as International Publication No. WO 2008/049764 and which claims the priority of German Patent Application, Serial No. 10 2006 049 867.4, filed Oct. 23, 2006, pursuant to 35 U.S.C. 119(a)-(d).

BACKGROUND OF THE INVENTION

The invention relates to a machine tool, wherein the machine tool has a workpiece clamping device for clamping a workpiece. The invention relates furthermore to a corresponding method.

On machine tools, machining forces occur between the tool and the workpiece, in particular during milling or turning. Depending on the dynamic compliance of the machine tools on the one hand, but also governed by technological parameters of the cutting process and the material of the workpiece on the other hand, there develops on the tool an interaction that establishes the relationship between the machining forces and the resultant deflections of the tool. Such an interaction can be made unstable, if for example the cutting width is chosen to be too great for the required cutting frequency, i.e. if the infeed is too fast. As a result, machine elements, the tool and/or the workpiece, undergo vibrations, in particular what are known as chatter vibrations. These clearly audible chatter vibrations leave what are known as chatter marks on the surface of the workpiece, which are generally unacceptable for the quality of the surface. For this reason, measures must be taken to avoid the vibrations.

A common procedure is to make the cutting process more conservative, by reducing the cutting width that is actually desired. However, this measure means increasing the machining time, and consequently reducing the efficiency of the machine.

Another approach is to determine the dynamic compliance of the machine tool and use a modal analysis to assign critical resonances occurring therein to the individual regions of the machine. By such an analysis, it can be established which regions of the machine have excessive compliance in comparison with the cutting process and are causally responsible for the chatter vibrations, i.e. the chattering. It is, however, difficult to remedy the situation in accordance with the findings obtained. Usually, the machine compliance cannot be reduced in the corresponding frequency ranges by a specific measure (for example increasing the stiffness of discrete components of the machine), but rather it is often necessary for the machine to be comprehensively reconstructed or even changed in its fundamental design. In the case of an already existing machine, this approach is in any case unfeasible.

German Offenlegungsschrift DT 25 20 946 A1 discloses a method for preventing or eliminating chatter vibrations of a working spindle of machine tools and a device for carrying out this method.

DE 698 04 982 T2 discloses a device and method for recommending dynamically preferred machining speeds.

Offenlegungsschrift DE 44 05 660 A1 discloses a method and an arrangement for operating a metal-removing machine tool, in particular a circular sawing, milling or grinding machine or the like.

Offenlegungsschrift DE 102 29 134 A1 discloses a device and a method for machining workpieces with rotating tools, in which, to reduce vibrations, a rotating tool is dynamically moved with respect to the driveshaft by an adjusting unit provided in a rotating system between the driveshaft and the tool.

Offenlegungsschrift DE 198 25 373 A1 discloses clamping a tool in a tool holding fixture, wherein vibrations occurring are reduced with the aid of a compliant, highly damping element which is inserted in the flux of force between the tool and the tool holding fixture.

Offenlegungsschrift DE 102 20 937 A1 discloses a method and a device

SUMMARY OF THE INVENTION

The invention is based on the object of providing a machine tool on which chatter vibrations occurring during a machining operation are reduced.

This object is achieved by a machine tool, wherein the machine tool has a workpiece clamping device for clamping a workpiece, wherein the workpiece clamping device, and in this way the workpiece, can be moved by means of a piezoactuator.

Furthermore, this object is achieved by a method for suppressing vibrations occurring during a machining operation on a machine tool, wherein the machine tool has a workpiece clamping device for clamping a workpiece, wherein the workpiece clamping device, and in this way the workpiece, are moved by means of a piezoactuator.

Advantageous forms of the invention are provided by the dependent claims.

Advantageous forms of the machine tool are obtained by analogy with the advantageous form of the method, and vice versa.

It proves to be advantageous if the workpiece clamping device, and in this way the workpiece, can be moved with respect to a work table by means of the piezoactuator, wherein the work table can be moved by means of an electric motor, This represents a customary refinement of the invention.

Furthermore, it proves to be advantageous if the piezoactuator is activated in such a way that the workpiece clamping device follows vibrational movements of a tool occurring during a machining operation. This measure allows vibrations of the machine that occur during the processing operation, in particular chatter vibrations, to be greatly reduced.

Furthermore, it proves to be advantageous if the activation of the piezoactuator takes place by means of a control device, wherein the control device is formed in such a way that the difference in speed between the speed of the workpiece clamping device and the speed of the tool is preferably controlled to zero. By this measure, a particularly great reduction of the vibrations can be achieved.

Furthermore, it proves to be advantageous if the speed of the workpiece clamping device is determined by means of an acceleration sensor localized in the direct vicinity of the workpiece clamping device, since then the speed of the workpiece clamping device can be determined very accurately.

Furthermore, it proves to be advantageous if the speed of the tool is determined by means of an acceleration sensor localized in the direct vicinity of the tool.

This measure allows the speed of the tool to be determined very accurately.

Furthermore, it proves to be advantageous if the control device for controlling the difference in speed has a controller and a transfer element arranged upstream or downstream of the controller, wherein the complex transfer function of the transfer element is formed in such a way that the transfer function has a pole point at a frequency of the vibration that is to be suppressed. As a result, a particularly great reduction of the vibrations is made possible.

Furthermore, it proves to be advantageous if the piezoactuator outputs a position signal, wherein the speed of the workpiece clamping device is determined by means of the position signal. This makes it possible for the speed of the workpiece clamping device to be determined in a simple manner.

Furthermore, it proves to be advantageous if, along with an active mounting by means of the piezoactuator, the workpiece clamping device is additionally mounted by means of a passive mounting. This ensures that, in the event of failure of the active mounting by means of the piezoactuator, clamping of the workpiece in the workpiece clamping device continues to be ensured.

BRIEF DESCRIPTION OF THE DRAWING

An exemplary embodiment of the invention is explained in more detail below and represented in the drawing, in which.

DETAILED DESCRIPTION OF PREFERRED EMBODIMENTS

Figure 1:
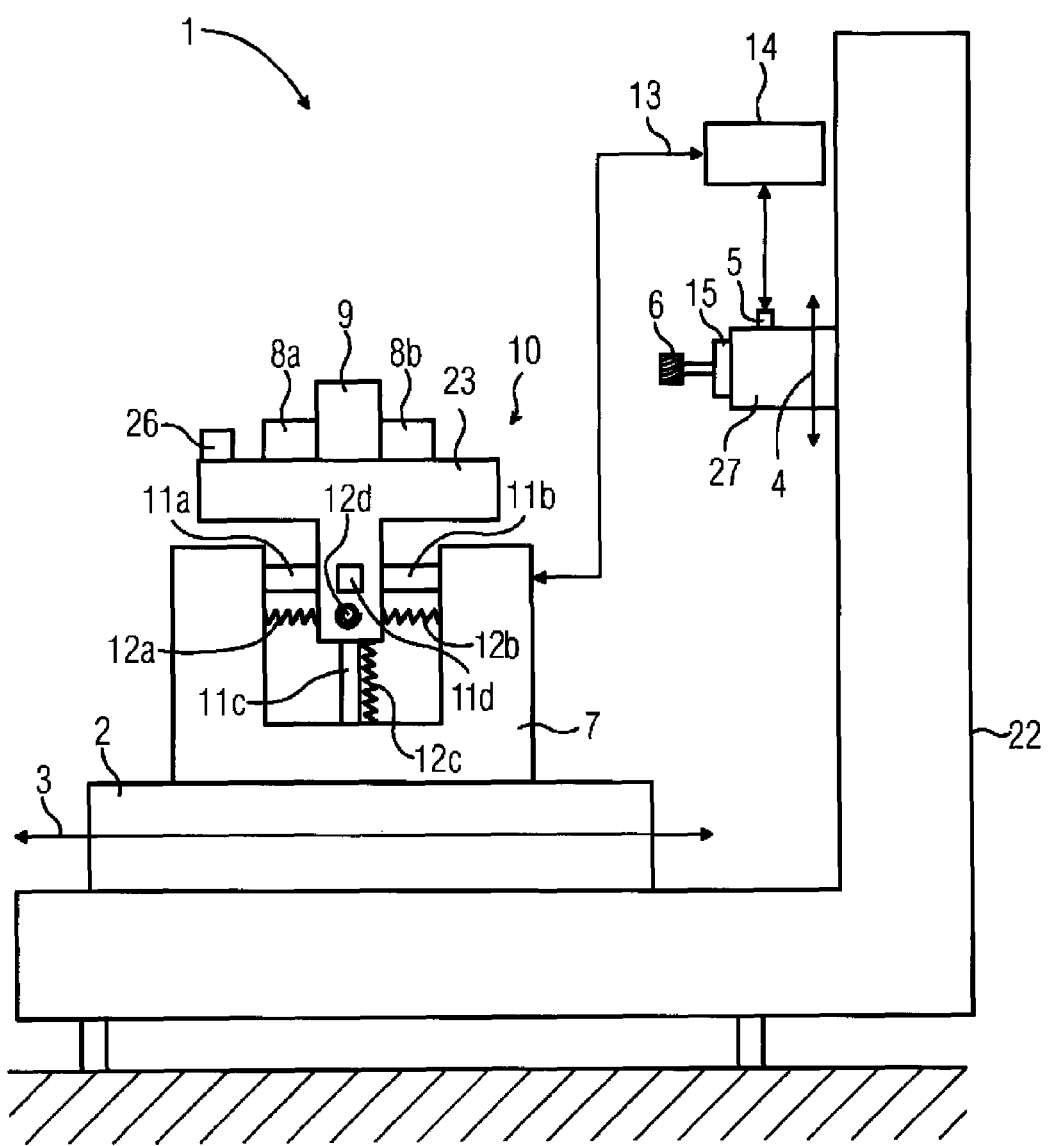
FIG. 1 shows a machine tool according to the invention.

FIG. 1 shows a machine tool 1 according to the invention in the form of a schematic representation. The machine tool 1 has, inter alia, a machine bed 22, a work table 2, which can be moved horizontally in the direction of the double-headed arrow 3 by means of an electric motor that is not represented for the sake of overall clarity, i.e. a movable work table 2, and a drive 27, which can be moved vertically in the direction of the double-headed arrow 4. The drive 27 rotatably drives a tool holding device 15, clamped in which is a tool 6, which is formed in the exemplary embodiment as a milling cutter. The drive 27 in this way rotatably drives the milling cutter.

In the case of commercially available machine tools, a workpiece clamping device for clamping a workpiece is fixedly mounted on the movable work table 2.

In the case of the machine tool according to the invention, by contrast with the commercially available machines, a workpiece clamping device 10 is movably mounted with respect to the work table 2 by means of piezoactuators. For clamping a workpiece 9, the workpiece clamping device 10 has two clamping jaws 8a and 8b. Furthermore, the workpiece clamping device 10 has a base element 23, to which the clamping jaws 8a and 8b are fastened. The workpiece clamping device 10 is actively mounted in all three directions of movement by means of piezoactuators 11a, 11b, 11c, 11d and a further piezoactuator, which cannot be seen, is located on the rear side and corresponds to the piezoactuator 11d. The workpiece clamping device 10 can be moved by means of the piezoactuators, wherein in this way the workpiece 9 can also be moved by means of the piezoactuators, since the workpiece 9 is clamped in the workpiece clamping device 10. The workpiece clamping device 10 and the workpiece can be moved by means of a piezoactuator. For the sake of overall clarity, the workpiece clamping device 10 is shown enlarged in FIG. 1.

Fixedly mounted on the work table 2 is what is known as a piezo table 7, wherein the piezoactuators are arranged between the workpiece clamping device 10 and the piezo table 7. In the exemplary embodiment, along with an active mounting by means of the piezoactuators, the workpiece clamping device 10 additionally has a passive mounting, which in the exemplary embodiment is in the form of shock absorbers 12a, 12b, 12c, 12d and a further shock absorber on the rear side of the workpiece clamping device 10, corresponding to the shock absorber 12d. The passive mounting ensures the static stiffness of the workpiece clamping device 10, so that the piezoactuators are only used for producing the necessary dynamic forces.

The controlling of the adjusting movements of the piezoactuators takes place by means of a control device 14, which activates the piezoactuators. On the input side, the control device 14 receives actual position signals, which indicate the position of the workpiece clamping device 10 with respect to the fixedly mounted piezo table 7, i.e. as a result with respect to the work table 2. The piezoactuators, which have as the active adjusting element a single piezo element or a number of such elements, additionally have for this purpose a position encoder integrated in the respective piezoactuators. The position encoder may, for example, be in the form of a strain gage or else in the form of a piezo element that is used for measuring purposes. The position signals are fed to the control device 14 as an input variable, which is indicated by a connection 13. Furthermore, the control device 14 activates the piezoactuators via the connection 13. Alternatively, it is also conceivable for an acceleration sensor 26 (depicted by dashed lines) to be fastened on the workpiece clamping device 10, which sensor feeds the acceleration of the workpiece clamping device 10 to the control device 14 as an input variable instead of the position of the workpiece clamping device 10. Furthermore, the speed of the tool 6 is determined, by means of an acceleration sensor 5 localized in the direct vicinity of the tool 6, and is fed to the control device 14 as an input variable, which is represented by an arrow 5 in FIG. 1.

In the exemplary embodiment, the acceleration sensor 5 is mounted on the drive 27.

The piezoactuators are then activated in such a way by the control device 14 that the workpiece clamping device 10 follows vibrational movements of the tool 6 occurring during a machining operation, caused for example by chattering. If, for example, in the representation according to FIG. 1, the milling cutter moves upward as result of a force occurring during the machining operation, this is registered by the acceleration sensor 5, since the movement of the milling cutter is transferred to the drive 27 via the tool holding device 15 and the acceleration sensor 5 emits a corresponding acceleration signal to the control device 14. The control device 14 then activates the piezoactuator 11c, preferably in such a way that the workpiece clamping device 10, and consequently in this way also the workpiece 9, follow vibrational movements of the tool occurring during a machining operation, in particular synchronously. The workpiece clamping device 10, and consequently in this way also the workpiece 9, are moved synchronously in relation to the vibrational movements of the milling cutter 6. If, in the course of its vibrational movement, the milling cutter performs an upward movement, for example, the piezoactuator 11c is then activated in such a way that the workpiece clamping device 10 is likewise moved upward. An analogous procedure is followed with the other directions of movement.

In the exemplary embodiment, the control device 14 is formed for this purpose in such a way that the difference in speed between the speed of the workpiece clamping device 10 and the speed of the tool 6 is controlled to zero.

Figure 2:
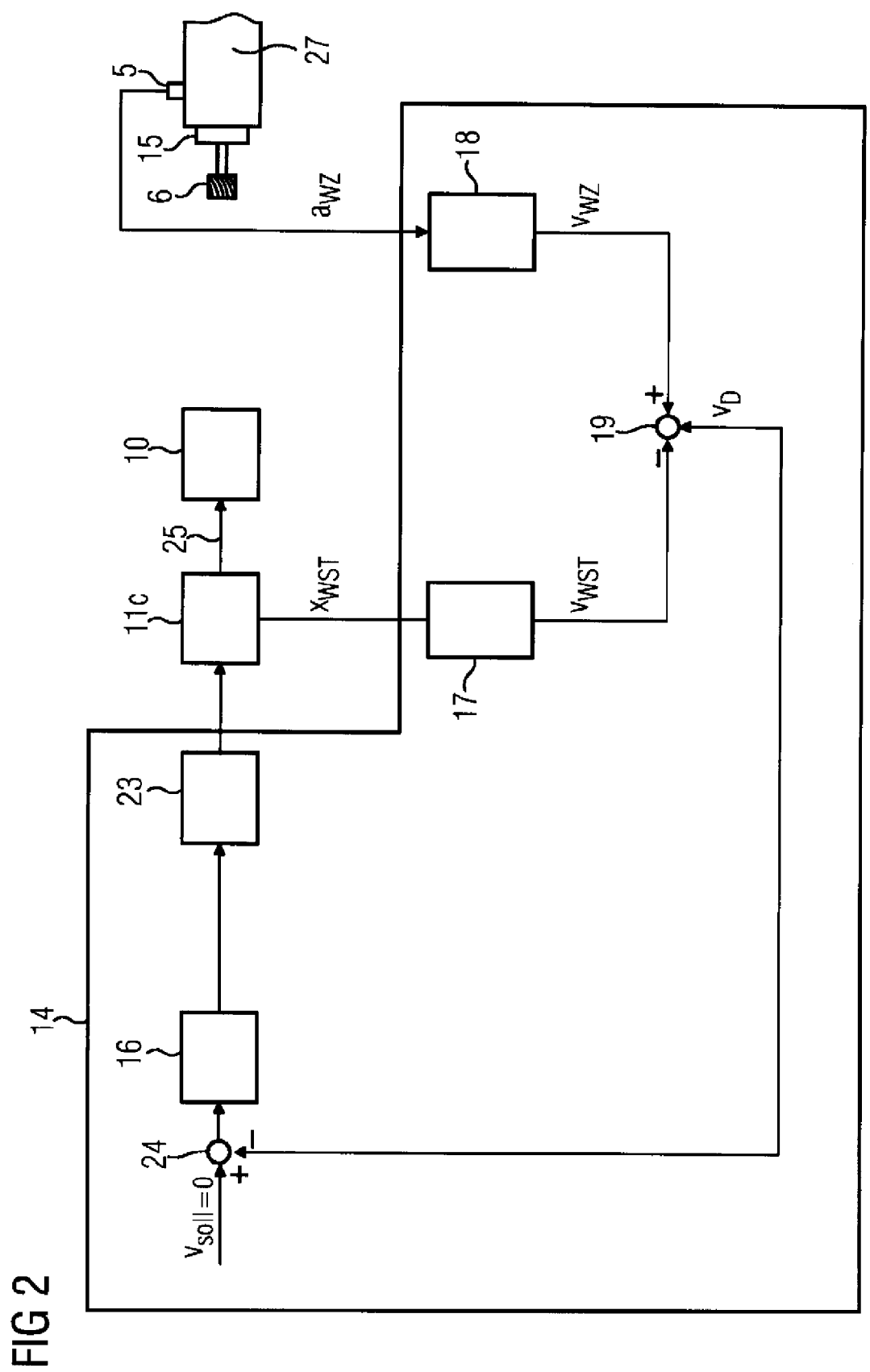
FIG. 2 shows a first form of a control device for the activation of the piezoactuator and
FIG. 3 shows a second form of a control device for the activation of the piezoactuator.

FIG. 2 shows a first form of the control device 14 in the form of a block diagram. In the exemplary embodiment, the control device 14 has a controller 16 (for example a proportional-plus-integral controller), a power module 23, a differentiator 17, an integrator 18, and two subtractors 19 and 24. The piezoactuator 11c outputs the position $x_{WST}$, which indicates the position of the workpiece 9 with respect to the work table 2, in particular the piezo table 7. The piezoactuator 11c acts on the workpiece clamping device 10, which is indicated in FIG. 2 by a corresponding arrow 25, and moves said device along in one direction. The position $x_{WST}$ of the workpiece is passed on as an input variable to a differentiator 17, which determines from the position $x_{WST}$ the speed $v_{WZT}$ of the workpiece clamping device and outputs it. As already stated, the vibrational movement of the tool 6 is transferred to the drive 27 via the tool holding device 15, the acceleration $a_{WZ}$ of the tool 6 thereby occurring being determined by means of the acceleration sensor 5 and output. The acceleration $a_{WZ}$ of the tool 6 is fed as an input variable to an integrator 18, which determines from it the speed $v_{WZ}$ of the tool and outputs the latter on the output side.

With the aid of a subtractor 19, the difference in speed $v_D$ ($v_D = v_{WZ} - v_{WZT}$) between the speed $v_{WZT}$ of the workpiece clamping device and the speed $v_{WZ}$ of the tool is determined and output on the output side. The difference in speed $v_D$ is subtracted by means of a subtractor 24 from a desired speed $v_{SOLL}$, which is set to zero. The output signal of the subtractor 24 obtained in this way is fed as an input variable to the controller 16. The controller 16 activates the piezoactuator 11c via a power module 23. The power module 23 provides the activating voltage necessary for operating the piezoactuator 11c. The difference in speed $v_D$ between the speed of the workpiece clamping device and the speed of the tool is controlled to zero by the control circuit, so that the tool clamping device follows vibrational movements of the tool occurring during the machining operation, in particular synchronously. For each direction of movement there is a respective control device.

Figure 3:
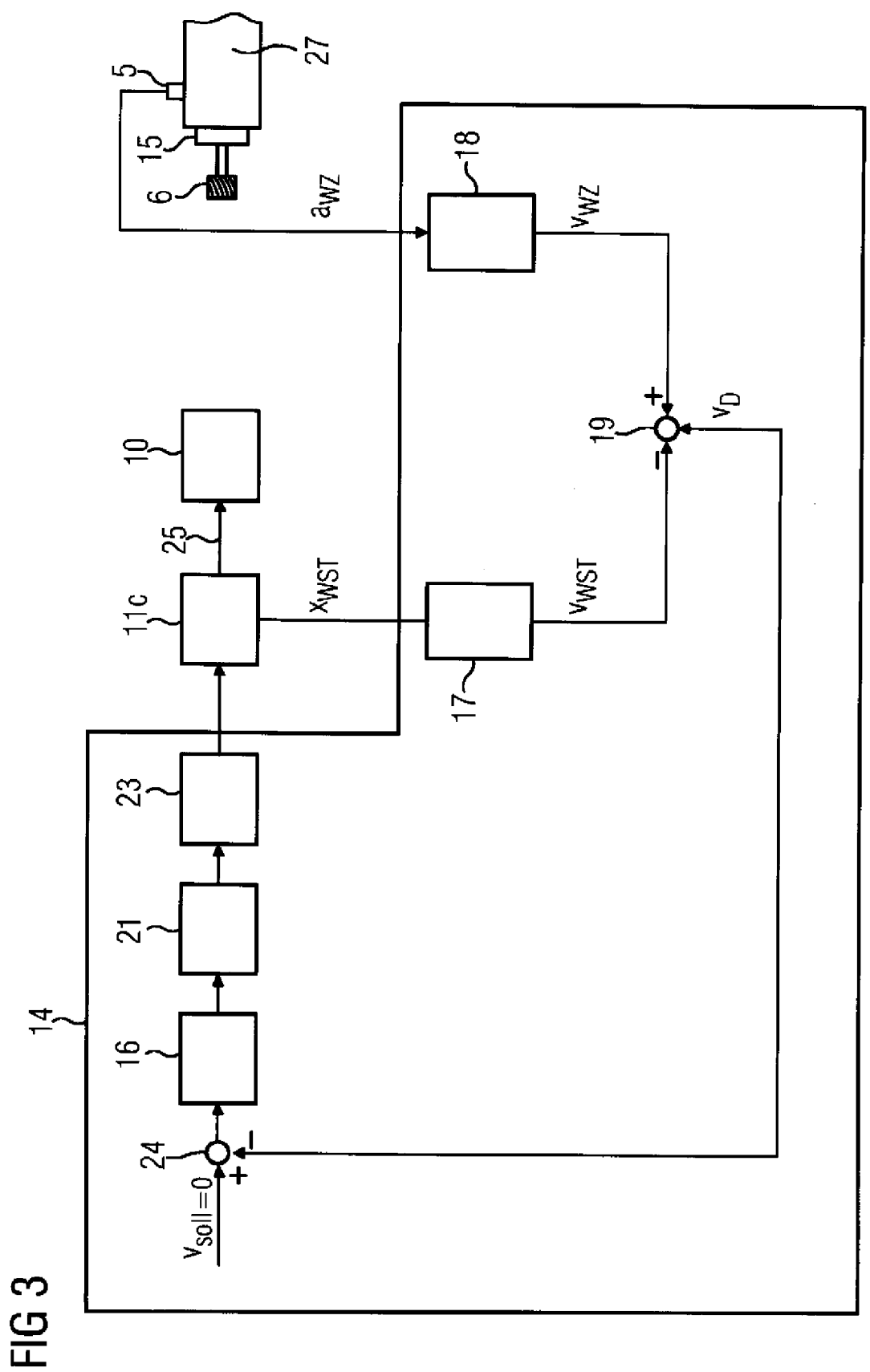

FIG. 3 shows a further embodiment of the control device 14. The embodiment represented in FIG. 3 substantially corresponds in the basic construction to the embodiment described above in FIG. 2. The same elements are therefore provided with the same designations in FIG. 3 as in FIG. 2. The only major difference is that, in the case of the embodiment according to FIG. 3, a transfer element 21 is arranged between the controller 16 and the power module 23. The transfer element 21 may in this case be arranged downstream of the controller 16, as in FIG. 3, or as an alternative to this, be arranged upstream of the controller 16, that is to say between the subtractor 24 and the controller 16. If a disturbing vibrational frequency $f_0$ of the vibrations is known, for example from a measurement, and it is consequently known which of the resonances is the cause of the vibrations, it is possible with suitable technical control measures to bring a specific influence to bear on it. To achieve a specific improvement of the dynamic stiffness in a certain frequency range, it is in this case proposed to use a method that is described in the document "Control System Design", Goodwin, Graebe, Salgado, Prentice Hall, 2001. A person of average skill in the art is familiar with this method under the name "Internal Model Principle". The control task can in this case be understood as that of making the workpiece that is actively mounted by means of piezoactuators track the measured movement of the workpiece as exactly as possible, so that the smallest possible difference between the two is obtained. The measured movement can therefore be interpreted as a reference variable for the control circuit of the actively mounted workpiece. The basic concept of the "Internal Model Principle" method is outlined below. Even if this method is often realized in practice in a time-discrete manner by means of digital systems, the basic concept should be described as a continuous sequence because it is then self-evident.

Application of the "Internal Model Principle" method is aimed at optimizing command behavior to certain signal forms of the reference variable. If, for example, it is known that a component of the reference variable of the control circuit is a harmonic signal with the frequency $f_0$, an ideal command behavior can be achieved for this reference variable—ideal in the sense that the reference variable $$w(t) = A \cdot \sin(2 \cdot \pi \cdot f_0 \cdot t + \phi_0) \tag{1}$$

in the steady state coincides exactly with the controlled variable, and does so independently of the amplitude A and phase $\phi_0$ of the reference variable w(t). It must be presupposed that the Laplace transform L of the signal only has poles on the imaginary axis, which is the case with harmonic signals as with a vibration with the frequency $f_0$:

$$L\{\sin(2 \cdot \pi \cdot f_0 \cdot t)\} = \frac{2 \cdot \pi \cdot f_0}{s^2 + (2 \cdot \pi \cdot f_0)^2} \tag{2}$$

With $\pm j2 \cdot \pi \cdot f_0$, the poles on the imaginary axis are:

j: imaginary unit s: complex angular frequency ($s = j2 \cdot \pi \cdot f$)

f: frequency

For such signals, the ideal command behavior is achieved by integrating the transfer element 21 with the poles of the Laplace transform of the signal into the control circuit. The transfer function H(s) of the transfer element 21 consequently becomes:

$$H(s) = \frac{1}{s^2 + (2 \cdot \pi \cdot f_0)^2} \tag{3}$$

The control circuit is stabilized by the transfer element, which has pole points in the Laplace transform of the signal. In the application, it often proves to be advantageous not to integrate an undamped vibratory transfer element into the control circuit, but a slightly damped element. Although the control deviation (output signal of the subtractor 24) at the frequency $f_0$ is then no longer exactly zero, in return the control circuit has a high degree of stability.

With this procedure, a significant lowering of the amplitude in the compliance frequency response is achieved in the range of the vibration frequency $f_0$ that is to be suppressed, in particular in the range of the chatter frequency. The transfer element 21 thereby represents a linear filter for weighting the vibration frequency $f_0$ that is to be suppressed.

The clamping force used for clamping the workpiece, with which the workpiece clamping device acts on the workpiece, remains constant when vibrations occur, i.e. the clamping force is not changed when the vibrations occur.

Furthermore, it is also possible for the position signals, acceleration signals and/or speed signals that are required for the invention also to be determined by means of the measuring devices that are present in any case on the machine.

What is claimed is:

1. Machine tool, comprising:
    a workpiece clamping device for clamping a workpiece;
    a tool for subjecting the workpiece to a machining operation;
    a piezoactuator moving the workpiece clamping device with the clamped workpiece, said piezoactuator rendered operative in response to a vibrational movement of the tool during the machining operation to cause the workpiece clamping device to follow the vibrational movement of the tool; and
    a control device operatively connected to the piezoactuator and constructed to control a difference in speed between a speed of the workpiece clamping device and a speed of the tool.

2. The machine tool of claim 1, further comprising a work table and an electric motor for moving the work table, said workpiece clamping device being movable with respect to the work table by the piezoactuator.

3. The machine tool of claim 1, wherein the piezoactuator outputs a position signal representative of the speed of the workpiece clamping device.

4. The machine tool of claim 1, further comprising a passive mounting to support the workpiece clamping device in addition to an active support of the workpiece clamping device by the piezoactuator.

5. machine tool, comprising:
    a workpiece clamping device for clamping a workpiece;
    a tool for subjecting the workpiece to a machining operation;
    a piezoactuator moving the workpiece clamping device with the clamped workpiece, said piezoactuator rendered operative in response to a vibrational movement of the tool during the machining operation to cause the workpiece clamping device to follow the vibrational movement of the tool; and
    a control device operatively connected to the piezoactuator and constructed to control a difference in speed between a speed of the workpiece clamping device and a speed of the tool to zero.

6. The machine tool of claim 5, further comprising an acceleration sensor disposed in close proximity to the workpiece clamping device to determine the speed of the workpiece clamping device.

7. The machine tool of claim 5, further comprising an acceleration sensor disposed in close proximity to the tool to determine the speed of the tool.

8. The machine tool of claim 5, wherein the control device includes a controller and a transfer element arranged upstream or downstream of the controller and configured to have a complex transfer function such that the transfer function has a pole point at a frequency of the vibration to be suppressed.

9. The machine tool of claim 5, further comprising a work table and an electric motor for moving the work table, said workpiece clamping device being movable with respect to the work table by the piezoactuator.

10. The machine tool of claim 5, wherein the piezoactuator outputs a position signal representative of the speed of the workpiece clamping device.

11. The machine tool of claim 5, further comprising a passive mounting to support the workpiece clamping device in addition to an active support of the workpiece clamping device by the piezoactuator.

* * * * *